United States Patent [19]
Ishihara

[11] Patent Number: 5,604,727
[45] Date of Patent: Feb. 18, 1997

[54] DATA RECORDING MEDIUM AN OPTICAL DISK AND AN OPTICAL DISK APPARATUS

[75] Inventor: Atsushi Ishihara, Yokohama, Japan

[73] Assignee: Kabushiki Kaisha Toshiba, Kawasaki, Japan

[21] Appl. No.: 409,069

[22] Filed: Mar. 23, 1995

[30] Foreign Application Priority Data

Mar. 24, 1994 [JP] Japan .................................. 6-079452

[51] Int. Cl.⁶ ...................................................... G11B 7/00
[52] U.S. Cl. ......................... 369/275.3; 369/50; 369/32; 369/58; 369/48
[58] Field of Search ................................ 369/275.3, 32, 369/54, 58, 47, 48, 49, 50, 59

[56]        References Cited

U.S. PATENT DOCUMENTS

| 4,777,542 | 10/1988 | Ozaki . |
| 4,937,804 | 6/1990 | Ishihara . |
| 5,218,590 | 6/1993 | Miyasaka .................................. 369/54 |
| 5,400,309 | 3/1995 | Satomura ................................... 369/32 |

FOREIGN PATENT DOCUMENTS

| 0282036 | 9/1988 | European Pat. Off. . |
| 0402912 | 12/1990 | European Pat. Off. . |
| 0517483 | 12/1992 | European Pat. Off. . |

OTHER PUBLICATIONS

Publication Number JP5274675, Patent Abstracts of Japan, vol. 18, No. 57, Publication date Oct. 22, 1992.

Primary Examiner—Muhammad N. Edun
Attorney, Agent, or Firm—Cushman, Darby & Cushman IP Group of Pillsbury Madison & Sutro LLP

[57]         ABSTRACT

According to the present invention, a synchronization code section preceding a synchronization byte section serving as data sync before a data area in a recording area of a sector is caused to include not a conventional single densest pattern but a pattern capable of synchronizing bytes. With this arrangement, data in the recording area can be correctly reproduced when the data is recorded in an optical disk of a phase change scheme by using a random shift.

18 Claims, 5 Drawing Sheets

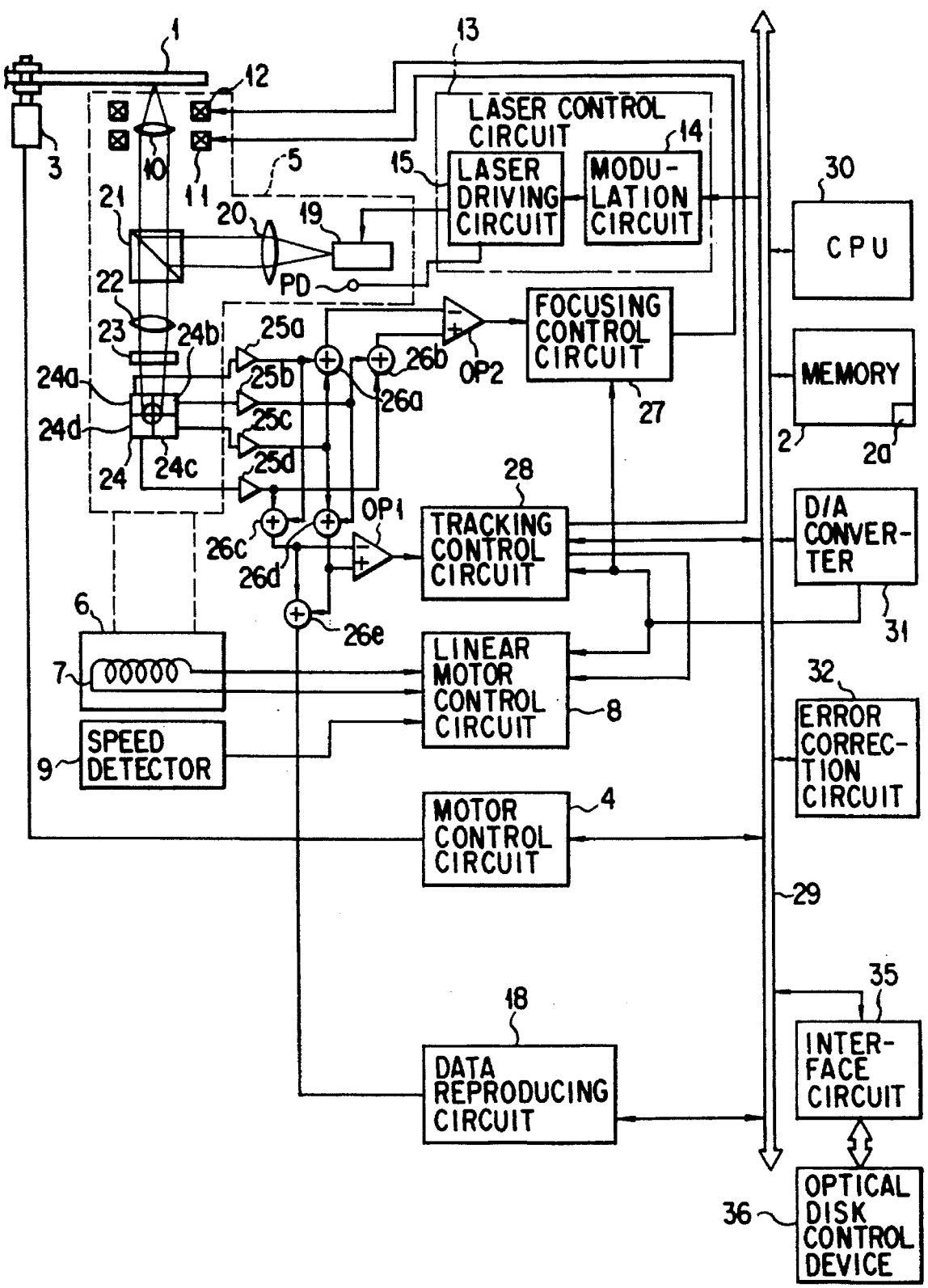
F I G. 1

| ZONE NUMBER | SECTORS/ CIRCUMFERENCE | CLOCK FREQUENCY VALUE (FREQUENCY DIVIDING VALUE) |
|---|---|---|
| 1 | 30 | |
| 2 | 31 | |
| 3 | 32 | |
| 4 | 33 | |
| ⋮ | ⋮ | ⋮ |
| 19 | 48 | |

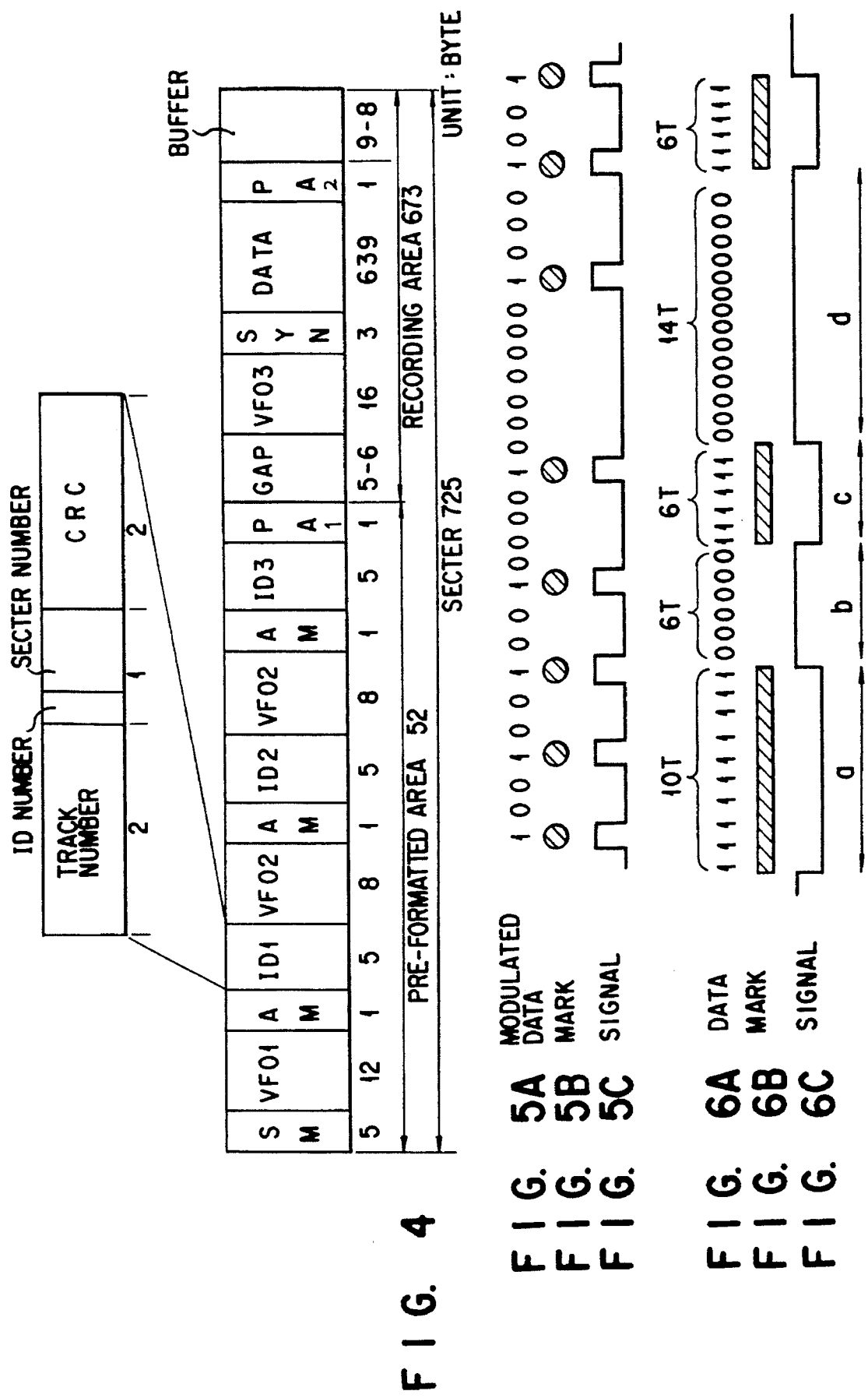

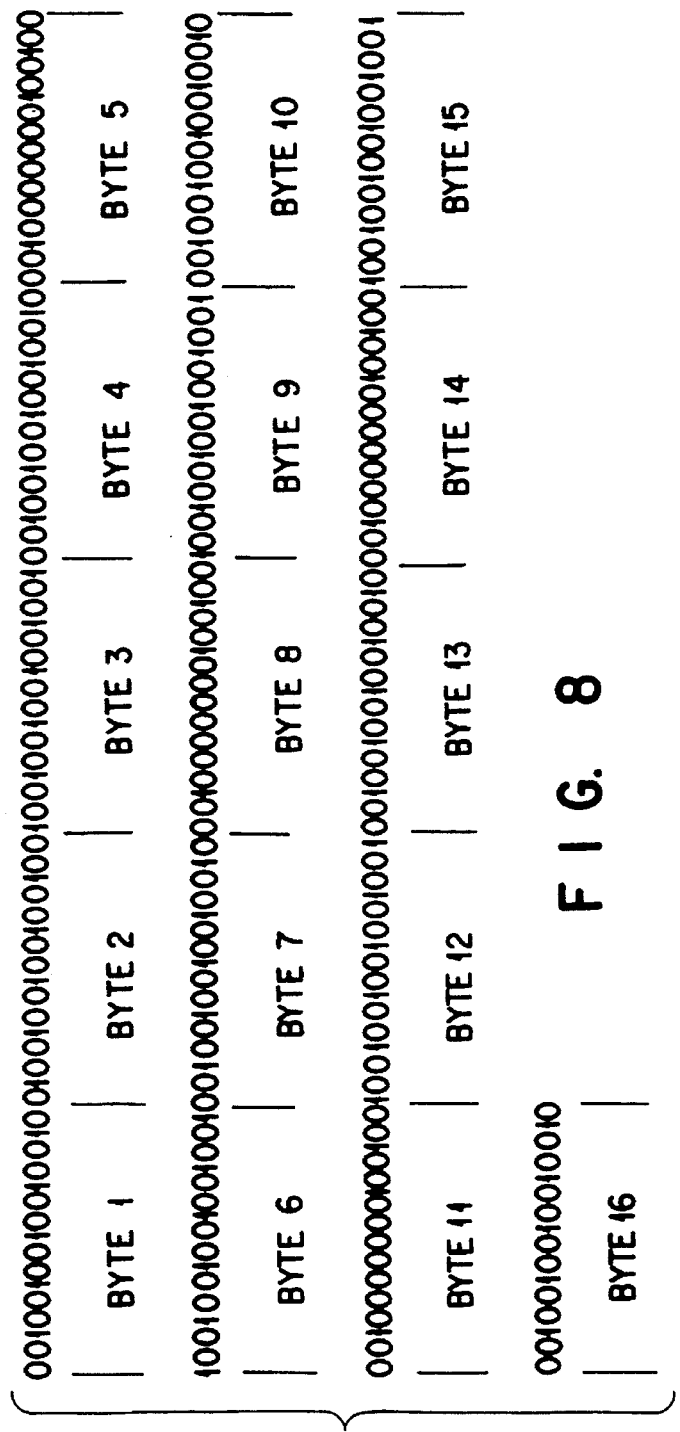
FIG. 8
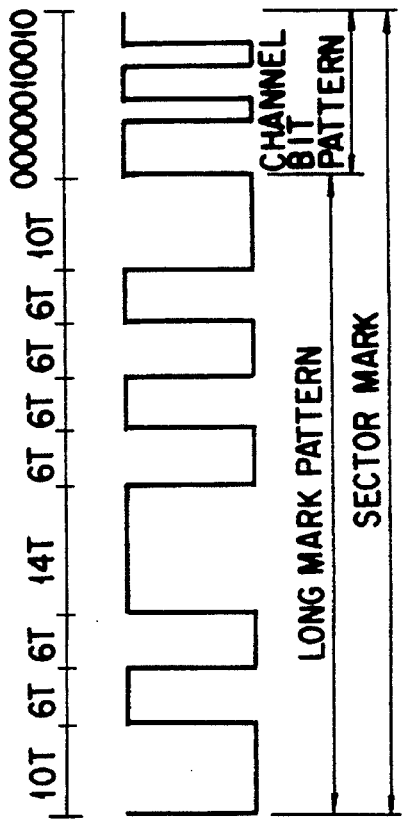
FIG. 7A NO MARK
FIG. 7B MARK

DATA RECORDING MEDIUM AN OPTICAL DISK AND AN OPTICAL DISK APPARATUS

BACKGROUND OF THE INVENTION

1. Field of the Invention

The present invention relates to an optical disk of a phase change scheme and an optical disk apparatus which records data in the optical disk and reproduces recorded data.

2. Description of the Related Art

An optical disk apparatus which records data in an optical disk of a phase change scheme and reproduces recorded data has been put into practical use.

The optical disk is divided into a plurality of zones each having a plurality of tracks in the radial direction. The tracks in a zone have the same number of sectors, and the zones are different in the number of sectors per track. When data is to be recorded in the optical disk or recorded data is to be reproduced, the optical disk is rotated at a constant speed, and data is recorded or recorded data is reproduced by means of an optical head on the basis of clock signals having different frequencies depending on zones. This optical head is moved in the radial direction of the optical disk, and then data is recorded or recorded data is reproduced in a predetermined track.

One sector has a capacity of 725 bytes and is made up of a 52-byte pre-formatted area (which corresponds to a header) and a 673-byte recording area (user data recording area) (see U.S. Pat. No. 4,937,804).

In order to increase the number of times of recording repetition by randomly distributing mark recording positions obtained by non-crystallizing a recording film at laser spots (i.e., to increase the number of times of overwriting with respect to the recording film), the above optical disk of the phase change scheme employs a scheme of delaying recorded data in one way which is randomly selected from the 0 to 16 channel bits in units of channel bits by an optical disk apparatus. This scheme is called "a random shift" in recording.

Since the recording area is randomly shifted backward within a maximum of 16 channel bits (which correspond to 1 byte in 2–7 modulation), deterioration in optical disk is reduced in appearance.

Since the recording area is randomly shifted backward by a maximum of 16 channel bits (which correspond to 1 byte in the 2–7 modulation), sector format allows a gap section GAP before the recording area and a buffer section subsequent to the recording area to have a 1-byte variable length.

In the conventional optical disk of the phase change scheme, however, as a means for synchronizing bytes in reproduction (i.e., the optical disk apparatus recognizes the boundary of reproduction data and an ordinal byte position in the sector format which corresponds to the boundary during reproduction), only three bytes are prepared as a synchronization byte section SYN for performing data sync (sync: synchronization) after the gap section in which a random shift is executed. For this reason, if the synchronization byte section SYN cannot be detected due to a defect, dust, a scratch on the optical disk, and the like, bytes cannot be resynchronized in correspondence with the random shift, resulting in a failure in correct reproduction of data in the recording area.

That is, if the synchronization code section SYN as data sync before the data area in the recording area of the sector cannot be detected, bytes cannot be synchronized, and the data in the data area cannot be reproduced.

SUMMARY OF THE INVENTION

It is an object of the present invention to correctly reproduce data in a recording area when the data is recorded in an optical disk of a phase change scheme by using a random shift.

To achieve the above object, the present invention provides a data recording medium comprising a data recording medium having data recorded tracks and adapted to reproduce recorded data by taking a frequency synchronization in a predetermined data length unit and a byte synchronization for recognizing a data recorded position, comprising:

a plurality of sectors defined by dividing the track into predetermined lengths as the predetermined data length unit for reproducing the recorded data from the track;

a header provided at a head portion of the respective sector and containing address information of the respective sector;

recording areas each provided subsequent to the header of the respective sector and containing data areas for recording data; and a frequency synchronization area containing a plurality of first areas provided prior to the data area in the recording area and storing a specific pattern for frequency synchronization and a second area provided between the first areas and storing a specific pattern for byte synchronization.

The present invention also provides an optical disk having either one kind of spiral and concentric tracks and a plurality of sector areas each constituted by tracks having a predetermined length, wherein each of the sector areas is constituted by a pre-formatted section and a recording area, the pre-formatted section having a sector mark section in which a sector mark indicating a start of the sector area is recorded, an address section which is provided subsequent to the sector mark section and in which address information is recorded, an address mark which is provided between the address section and the sector mark section and in which an address mark indicating a start of the address section is recorded, a postamble section which is provided subsequent to the address section and indicates an end of the address section, and a first synchronization code section which is provided between the sector mark section and the postamble section and in which a first specific pattern is recorded to synchronize frequencies for reproducing the address information of the address section, and the recording area having a gap section as an empty area which is provided subsequent to the postamble section of the pre-formatted section, a data area which is provided subsequent to the gap section and in which desired data is recorded, a postamble section which is provided subsequent to the data area and indicates an end of the data area, a buffer section as an empty area which is provided subsequent to the postamble section and serves as a boundary of a next sector area, a second synchronization code section which is provided between the gap section and the data area and in which a second specific pattern for synchronizing frequencies for reproducing data recorded in the data area and a third specific pattern for synchronizing bytes for reproducing the data recorded in the data area are recorded, and a byte synchronization section which is provided between the second synchronization code section and the data area and in which the third specific pattern is recorded.

The present invention further provides an optical disk apparatus for reproducing data recorded in an optical disk having either one kind spiral and concentric tracks and a plurality of sector areas each constituted by tracks having a predetermined length, wherein each of the sector areas of the optical disk is constituted by a pre-formatted section and a recording area, the pre-formatted section having a sector mark section in which a sector mark indicating start of the sector area is recorded, an address section which is provided subsequent to the sector mark section and in which address information is recorded, an address mark which is provided between the address section and the sector mark section and in which an address mark indicating start of the address section is recorded, a postamble section which is provided subsequent to the address section and indicates end of the address section, and a first synchronization code section which is provided between the sector mark section and the postamble section and in which a first specific pattern is recorded to synchronize frequencies for reproducing the address information of the address section, and the recording area having a gap section as an empty area which is provided subsequent to the postamble section of the pre-formatted section, a data area which is provided subsequent to the gap section and in which desired data is recorded, a postamble section which is provided subsequent to the data area and indicates end of the data area, a buffer section as an empty area which is provided subsequent to the postamble section and serves as a boundary of a next sector area, a second synchronization code section which is provided between the gap section and the data area and in which a second specific pattern for synchronizing frequencies for reproducing data recorded in the data area and a third specific pattern for synchronizing bytes for reproducing the data recorded in the data area are recorded, and a byte synchronization section which is provided between the second synchronization code section and the data area and in which the third specific pattern is recorded, the optical disk apparatus comprising reproducing means for synchronously reproducing the data of the data area in accordance with the second and third specific patterns of the second synchronization code section and the third specific pattern of the byte synchronization section.

The present invention further provides an optical disk having either one kind of spiral and concentric tracks and a plurality of sector areas each constituted by tracks having a predetermined length, wherein each of the sector areas is constituted by a pre-formatted section and a recording area, the pre-formatted section having a sector mark section in which a sector mark indicating start of the sector area is recorded, an address section which is provided subsequent to the sector mark section and in which address information is recorded, an address mark which is provided between the address section and the sector mark section and in which an address mark indicating start of the address section is recorded, a postamble section which is provided subsequent to the address section and indicates end of the address section, and a first synchronization code section which is provided between the sector mark section and the postamble section and in which a first specific pattern is recorded to synchronize frequencies for reproducing the address information of the address section, and the recording area having a gap section as an empty area which is provided subsequent to the postamble section of the pre-formatted section, a data area which is provided subsequent to the gap section and in which desired data is recorded, a postamble section which is provided subsequent to the data area and indicates end of the data area, a buffer section as an empty area which is provided subsequent to the postamble section and serves as a boundary of a next sector area, a second synchronization code section which is provided between the gap section and the data area and in which a second specific pattern for synchronizing frequencies for reproducing data recorded in the data area and a third specific pattern for synchronizing bytes for reproducing the data recorded in the data area are recorded, and a byte synchronization section which is provided between the second synchronization code section and the data area and in which the third specific pattern is recorded, and an area length of the buffer section and an area length of the gap section are variable so as to allow to shift back and forth a position of the data area in which the data is recorded.

The present invention further provides an optical disk apparatus for reproducing data recorded in an optical disk having either one kind of spiral and concentric tracks and a plurality of sector areas each constituted by tracks having a predetermined length, wherein each of the sector areas of the optical disk is constituted by a pre-formatted section and a recording area, the pre-formatted section having a sector mark section in which a sector mark indicating start of the sector area is recorded, an address section which is provided subsequent to the sector mark section and in which address information is recorded, an address mark which is provided between the address section and the sector mark section and in which an address mark indicating start of the address section is recorded, a postamble section which is provided subsequent to the address section, and indicates end of the address section, and a first synchronization code section which is provided between the sector mark section and the postamble section and in which a first specific pattern is recorded to synchronize frequencies for reproducing the address information of the address section, and the recording area having a gap section as an empty area which is provided subsequent to the postamble section of the pre-formatted section, a data area which is provided subsequent to the gap section and in which desired data is recorded, a postamble section which is provided subsequent to the data area, and indicates end of the data area, a buffer section as an empty area which is provided subsequent to the postamble section and serves as a boundary of a next sector area, a second synchronization code section which is provided between the gap section and the data area and in which a second specific pattern for synchronizing frequencies for reproducing data recorded in the data area and a third specific pattern for synchronizing bytes for reproducing the data recorded in the data area are recorded, and a byte synchronization section which is provided between the second synchronization code section and the data area and in which the third specific pattern is recorded, and an area length of the buffer section and an area length of the gap section are variable so as to allow to shift back and forth a position of the data area in which the data is recorded, the optical disk apparatus comprising reproducing means for synchronously reproducing the data of the data area in accordance with the second and third specific patterns of the second synchronization code section and the third specific pattern of the byte synchronization section.

The present invention further provides an optical disk recording data in a phase change scheme and having either one kind of spiral and concentric tracks and a plurality of sector areas each constituted by tracks having a predetermined length, wherein each of the sector areas is constituted by a pre-formatted section and a recording area, the pre-formatted section having a sector mark section in which a sector mark indicating a start of the sector area is recorded, an address section which is provided subsequent to the sector mark section and in which address information is recorded, an address mark which is provided between the address section and the sector mark section and in which an address mark indicating a start of the address section is recorded, a postamble section which is provided subsequent to the address section and indicates an end of the address section, and a first synchronization code section which is provided between the sector mark section and the postamble section and in which a first specific pattern is recorded to synchronize frequencies for reproducing the address information of the address section, and the recording area having a gap section as an empty area which is provided subsequent to the postamble section of the pre-formatted section, a data area which is provided subsequent to the gap section and in which desired data is recorded, a postamble section which is provided subsequent to the data area and indicates an end of the data area, a buffer section as an empty area which is provided subsequent to the postamble section and serves as a boundary of a next sector area, a second synchronization code section which is provided between the gap section and the data area and in which a second specific pattern for synchronizing frequencies for reproducing data recorded in the data area and a third specific pattern for synchronizing bytes for reproducing the data recorded in the data area are recorded, and a byte synchronization section which is provided between the second synchronization code section and the data area and in which the third specific pattern is recorded.

The present invention further provides an optical disk apparatus for reproducing data recorded in an optical disk recording data in a phase change scheme and having either one kind of spiral and concentric tracks and a plurality of sector areas each constituted by tracks having a predetermined length, wherein each of the sector areas of the optical disk is constituted by a pre-formatted section and a recording area, the pre-formatted section having a sector mark section in which a sector mark indicating start of the sector area is recorded, an address section which is provided subsequent to the sector mark section and in which address information is recorded, an address mark which is provided between the address section and the sector mark section and in which an address mark indicating start of the address section is recorded, a postamble section which is provided subsequent to the address section and indicates end of the address section, and a first synchronization code section which is provided between the sector mark section and the postamble section and in which a first specific pattern is recorded to synchronize frequencies for reproducing the address information of the address section, and the recording area having a gap section as an empty area which is provided subsequent to the postamble section of the pre-formatted section, a data area which is provided subsequent to the gap section and in which desired data is recorded, a postamble section which is provided subsequent to the data area and indicates end of the data area, a buffer section as an empty area which is provided subsequent to the postamble section and serves as a boundary of a next sector area, a second synchronization code section which is provided between the gap section and the data area and in which a second specific pattern for synchronizing frequencies for reproducing data recorded in the data area and a third specific pattern for synchronizing bytes for reproducing the data recorded in the data area are recorded, and a byte synchronization section which is provided between the second synchronization code section and the data area and in which the third specific pattern is recorded, the optical disk apparatus comprising reproducing means for synchronously reproducing the data of the data area in accordance with the second and third specific patterns of the second synchronization code section and the third specific pattern of the byte synchronization section.

The present invention further provides an optical disk recording data in a phase change scheme and having either one kind of spiral and concentric tracks and a plurality of sector areas each constituted by tracks having a predetermined length, wherein each of the sector areas is constituted by a pre-formatted section and a recording area, the pre-formatted section having a sector mark section in which a sector mark indicating start of the sector area is recorded, an address section which is provided subsequent to the sector mark section and in which address information is recorded, an address mark which is provided between the address section and the sector mark section and in which an address mark indicating start of the address section is recorded, a postamble section which is provided subsequent to the address section and indicates end of the address section, and a first synchronization code section which is provided between the sector mark section and the postamble section and in which a first specific pattern is recorded to synchronize frequencies for reproducing the address information of the address section, and the recording area having a gap section as an empty area which is provided subsequent to the postamble section of the pre-formatted section, a data area which is provided subsequent to the gap section and in which desired data is recorded, a postamble section which is provided subsequent to the data area and indicates end of the data area, a buffer section as an empty area which is provided subsequent to the postamble section and serves as a boundary of a next sector area, a second synchronization code section which is provided between the gap section and the data area and in which a second specific pattern for synchronizing frequencies for reproducing data recorded in the data area and a third specific pattern for synchronizing bytes for reproducing the data recorded in the data area are recorded, and a byte synchronization section which is provided between the second synchronization code section and the data area and in which the third specific pattern is recorded, and an area length of the buffer section and an area length of the gap section are variable so as to allow to shift back and forth a position of the data area in which the data is recorded.

The present invention further provides an optical disk apparatus for reproducing data recorded in an optical disk recording data in a phase change scheme and having either one kind of spiral and concentric tracks and a plurality of sector areas each constituted by tracks having a predetermined length, wherein each of the sector areas of the optical disk is constituted by a pre-formatted section and a recording area, the pre-formatted section having a sector mark section in which a sector mark indicating start of the sector area is recorded, an address section which is provided subsequent to the sector mark section and in which address information is recorded, an address mark which is provided between the address section and the sector mark section and in which an address mark indicating start of the address section is recorded, a postamble section which is provided subsequent to the address section, and indicates end of the address section, and a first synchronization code section which is provided between the sector mark section and the postamble section and in which a first specific pattern is recorded to synchronize frequencies for reproducing the address information of the address section, and the recording area having a gap section as an empty area which is provided subsequent to the postamble section of the pre-formatted section, a data area which is provided subsequent to the gap section and in which desired data is recorded, a postamble section which is provided subsequent to the data area, and indicates end of the data area, a buffer section as an empty area which is provided subsequent to the postamble section and serves as a boundary of a next sector area, a second synchronization code section which is provided between the gap section and the data area and in which a second specific pattern for synchronizing frequencies for reproducing data recorded in the data area and a third specific pattern for synchronizing bytes for reproducing the data recorded in the data area are recorded, and a byte synchronization section which is provided between the second synchronization code section and the data area and in which the third specific pattern is recorded, and an area length of the buffer section and an area length of the gap section are variable so as to allow to shift back and forth a position of the data area in which the data is recorded, the optical disk apparatus comprising reproducing means for synchronously reproducing the data of the data area in accordance with the second and third specific patterns of the second synchronization code section and the third specific pattern of the byte synchronization section.

The present invention further provides an optical disk having a plurality of sector areas, wherein each of the sector areas is constituted by a gap section as an empty area, a data area in which data is recorded, and a byte synchronization section which is provided between the data area and the gap section and in which a specific pattern for synchronizing bytes for reproducing the data of the data area is recorded.

The present invention further provides an optical disk having a plurality of sector areas, wherein each of the sector areas is constituted by a data area in which data is recorded, a gap section which is provided as an empty area having a variable length so as to allow to shift the data area in each of the sector areas, and a byte synchronization section which is provided between the gap section and the data area and in which a specific pattern for synchronizing bytes for reproducing the data of the data area is recorded.

The present invention further provides an optical disk having a plurality of sector areas, wherein each of the sector areas is constituted by a data area in which data is recorded, a gap section which is provided as an empty area having a variable length so as to allow to shift the data area in each of the sector areas, and a frequency synchronization section which is provided between the gap section and the data area and in which a plurality of specific patterns for synchronizing bytes for reproducing the data of the data area at an interval larger than a shift amount of the data area are recorded.

The present invention further provides an optical disk apparatus for reproducing data recorded in an optical disk which has a plurality of sector areas and in which data is recorded according to a phase change scheme, wherein each of the sector areas of the optical disk is constituted by a gap section as an empty area, a data area in which data is recorded, and a byte synchronization section which is provided between the data area and the gap section and in which a specific pattern for synchronizing bytes for reproducing the data of the data area is recorded, the optical disk apparatus comprising reproducing means for synchronously reproducing the data of the data area in accordance with the specific pattern of the byte synchronization section.

The present invention further provides an optical disk apparatus for reproducing data recorded in an optical disk which has a plurality of sector areas and in which data is recorded according to a phase change scheme, wherein each of the sector areas of the optical disk is constituted by a data area in which data is recorded, a gap section which is provided as an empty area having a variable length so as to allow to shift the data area in each of the sector areas, and a byte synchronization section which is provided between the gap section and the data area and in which a specific pattern for synchronizing bytes for reproducing the data of the data area is recorded, the optical disk apparatus comprising reproducing means for synchronously reproducing the data of the data area in accordance with the specific pattern of the byte synchronization section.

The present invention further provides an optical disk apparatus for reproducing data recorded in an optical disk which has a plurality of sector areas and in which data is recorded according to a phase change scheme, wherein each of the sector areas of the optical disk is constituted by a data area in which data is recorded, a gap section which is provided as an empty area having a variable length so as to allow to shift the data area in each of the sector areas, and a frequency synchronization section which is provided between the gap section and the data area and in which a plurality of specific patterns for synchronizing bytes for reproducing the data of the data area at an interval larger than a shift amount of the data area are recorded, the optical disk apparatus comprising reproducing means for synchronously reproducing the data of the data area in accordance with the specific pattern of the frequency synchronization section.

The present invention further provides a reproducing method for an optical disk apparatus for reproducing data recorded in an optical disk in which data is recorded according to a phase change scheme and which has a plurality of sector areas each having a gap section as an empty area, a data area in which data is recorded, and a byte synchronization section which is provided between the data area and the gap section and in which a specific pattern for synchronizing bytes for reproducing the data of the data area is recorded, wherein the data of the data area is synchronously reproduced in accordance with the specific pattern of the byte synchronization section.

The present invention further provides a reproducing method for an optical disk apparatus for reproducing data recorded in an optical disk in which data is recorded according to a phase change scheme and which has a plurality of sector areas each having a data area in which data is recorded, a gap section which is provided as an empty area having a variable length so as to allow to shift the data area in each of the sector areas, and a byte synchronization section which is provided between the gap section and the data area and in which a specific pattern for synchronizing bytes for reproducing the data of the data area is recorded, wherein the data of the data area is synchronously reproduced in accordance with the specific pattern of the byte synchronization section.

The present invention further provides a reproducing method for an optical disk apparatus for reproducing data recorded in an optical disk in which data is recorded according to a phase change scheme and which has a plurality of sector areas each having a data area in which data is recorded, a gap section which is provided as an empty area having a variable length so as to allow to shift the data area in each of the sector areas, and a byte synchronization section which is provided between the gap section and the data area and in which a plurality of specific patterns for synchronizing bytes for reproducing the data of the data area at an interval larger than a shift amount of the data area are recorded, wherein the data of the data area is synchronously reproduced in accordance with the specific pattern of the byte synchronization section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block circuit diagram showing an optical disk apparatus according to one embodiment of the present invention;

FIG. 4 shows an example of how a sector is formatted;

FIGS. 5A to 5C show how data is recorded in a sector;

FIGS. 6A to 6C and FIGS. 7A and 7B show the pattern of a sector mark;

FIG. 8 shows how data is recorded in a synchronization code section VF03; and

DETAILED DESCRIPTION OF THE PREFERRED EMBODIMENTS

An embodiment of the present invention will now be described with reference to the accompanying drawings.

FIG. 1 shows an optical disk apparatus according to one embodiment of the present invention. The optical disk apparatus records and reproduces data with respect to an optical disk 1, using a convergent light beam.

The optical disk 1 is obtained by preparing a circular substrate formed of glass or plastics and forming a metal coating layer of tellurium, bismuth, or the like on the surface of the substrate.

Figures 2, 3:
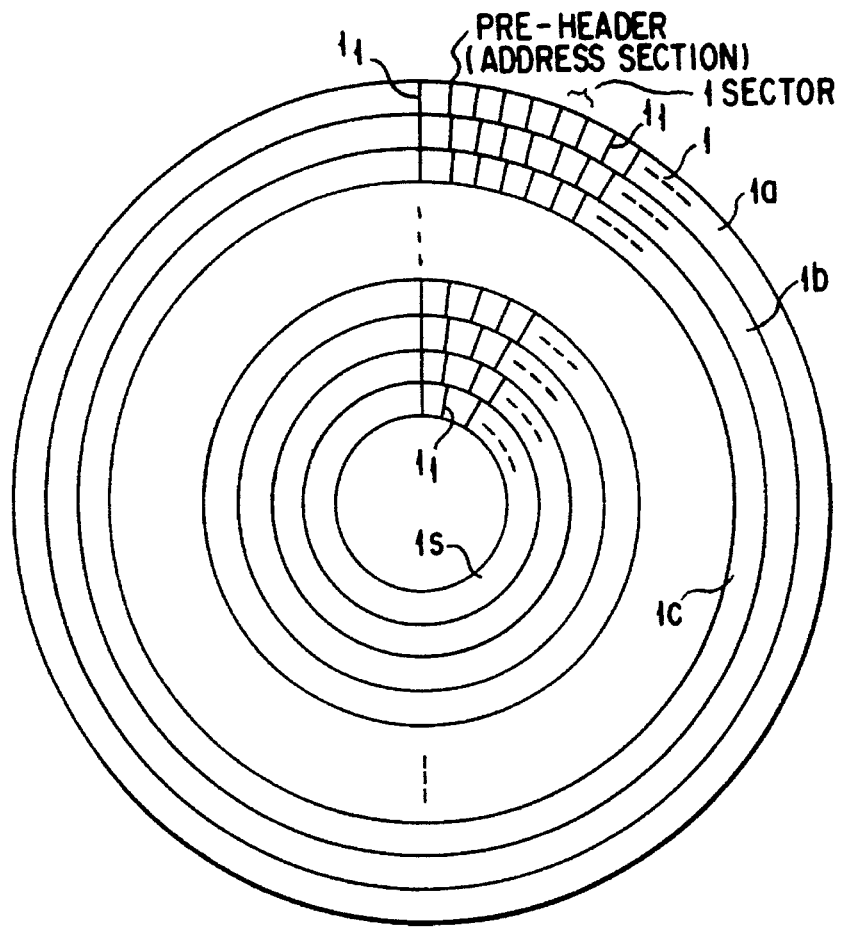
FIG. 2 is a diagram showing an example of how an optical disk is formatted.
FIG. 3 shows the frequencies of the clock signals used for the respective zones.

As shown in FIG. 2, the optical disk 1 is divided into a plurality of zones $1a, 1b, \ldots, 1s$ (e.g., nineteen zones), each having a plurality of tracks. The clock signals used for the zones $1a, 1b, \ldots, 1s$ have different frequencies (to be specific, the clock signals increase in frequency from the innermost zone to the outermost zone). The number of sectors provided for one track differs, depending upon the zones. The relationships between the frequency dividing values corresponding to the frequencies of the clock signals used for the zones $1a, 1b, \ldots, 1s$ and the number of sectors provided for one track are stored in the table $2a$ of a memory 2, as shown in FIG. 3.

In each track of each of the zones $1a, 1b, \ldots, 1s$ of the optical disk 1, a header $1_1$ for storing an address or the like is pre-formatted for each other.

The format of each of the sectors of the zones $1a, 1b, \ldots, 1s$ of the optical disk 1 is illustrated in FIG. 4. The format illustrated in FIG. 4 is a sector format based on to a continuous-servo tracking system (composite continuous tracking system) which detects a tracking error signal by a push-pull method.

Referring to FIG. 4, one sector has a capacity of 725 bytes and is made up of a 52-byte pre-formatted area (which corresponds to a header $1_1$), and 673-byte recording area (user data recording area). One byte shows the 16 channel bits on the optical disk 1.

The data recorded in the sector mentioned above is data subjected to 2–7 code modulation, and two to seven "0"s are inserted between "1" and "1", as indicated in FIGS. 5A to 5C.

The pre-formatted area illustrated in FIG. 4 is an area in which predetermined data is recorded when the optical disk is manufactured. The pre-formatted area is made up of the following areas: a 5-byte sector mark SM, a 12-byte synchronization code section VF01, two 12-byte synchronization code sections VF02, VF02, three 1-byte address marks AM, three 5-byte address sections ID, and a 1-byte postamble PA1.

In the area of the sector mark SM, a special pattern which is provided to distinguish the start of a sector from data without using a PLL (Phase-Locked Loop), and indicates the start of the sector (i.e., a pattern which can be easily discriminated from data) is recorded. The sector mark SM has a length of 80 channel bits, and comprises emboss data following read-in of the synchronization code section VF01. A continuous data pattern for channel bit synchronization (synchronization code) is recorded in each of the areas of the synchronization code sections VF01 and VF02. A special pattern indicating the start of an address is recorded in each of the areas of the address marks AM. A 2-byte track number, a 1-byte sector number, and a 2-byte error correction code (ECC) are recorded in each of the areas of the address sections ID. The postamble PA is used when the error correction code in the address section ID is more than 2 bytes.

The synchronization code section VF01 has a capacity of 192 channel bits, and its channel bit pattern is "010010010010 . . . 10010".

One synchronization code section VF02 has a capacity of 128 channel bits, and its channel bit pattern is "100100100100 . . . 10010".

The other synchronization code section VF02 has a capacity of 128 channel bits, and its channel bit pattern is "000100100100 . . . 10010".

As will be shown in FIGS. 6A to 6C and FIGS. 7A and 7B, the sector mark SM is actually formed on the optical disk 1, which is seen as if a plurality of "1"s are continuous.

The sector mark pattern recorded in the sector mark SM is made up of a long mark pattern of 10 Ts (T=a 1-channel bit length) in a section a, 6 Ts in a section b, 6 Ts in a section c, 14 Ts in a section d, 6 Ts in each of sections e to h, and 10 Ts in a section, and a channel bit pattern "0000010010" (for read-in).

Each address mark AM is a pattern which can be easily discriminated from data, and is constituted by a 16-channel bit length pattern "0100100000000100" for synchronizing bytes with the subsequent address section ID. Byte synchronization is performed for determining the recording position of data when the data is to be reproduced.

Each address section ID is made up of the first byte indicating a track number MSB, the second byte indicating a track number LSB, the third byte whose bits 7 and 6 indicate that this address section ID is the address section ID1, ID2, or ID3, and bits 5 to 0 indicate a sector number (binary notation), and the fourth and fifth bytes having CRC (cyclic redundancy check) data obtained by calculating the first three bytes.

The postamble PA1 has a length of 16 channel bits. The postamble PA1 is next to the CRC of the address section ID3, and indicates the end of this CRC.

A gap GAP does not include emboss data, and is randomly set within a length of 80 to 96 channel bits for each 1-channel bit length. With this arrangement, data recorded in the next synchronization code section VF03 and subsequent sections are randomly shifted within a length of 16 channel bits every 1-channel bit length.

A recording area illustrated in FIG. 4 is made up of the following areas: the 5- or 6-byte gap GAP (non-recording area), a 16-byte synchronization code section VF03, a 3-byte data mark SYN, a 639-byte data area DATA, a 1-byte postamble PA2, and a 9- or 8-byte buffer BUFFER (non-recording area).

In the area of the synchronization code section VF03, a continuous data pattern (synchronization code) for channel bit synchronization is recorded. A special pattern having a length of 48 channel bits indicating the start of the data area DATA is recorded in the area of the synchronization byte section SYN. User's data (512 bytes), and also data of an ECC (error correction code; 80 bytes), a CRC (cyclic redundancy check code; 4 bytes), a resynchronization code (resync pattern) RESYNC (39 bytes) as a specific code for synchronization, and the like are recorded in the data area DATA.

As shown in FIG. 8, any one of patterns "010010010010010010", "1001001001001001", and "001001001001001010" is recorded in any of bytes 1 to 4, bytes 6 and 7, bytes 9 and 10, bytes 12 and 13, and bytes 15 and 16 in the area of the synchronization code section VF03.

A pattern "0010000000100100" is recorded in bytes 5, 8, 11, and 14. This pattern is the same as reproduction synchronization pattern RESYNC (resync pattern) recorded in the data area DATA mentioned above.

The area of the synchronization byte section SYN is made up of a 3-byte synchronization code "010000100100001000100010010001001001000001001001000".

The postamble PA2 has a length of 16 channel bits. The postamble PA2 is next to the data area DATA, and indicates the end of the data area DATA.

The buffer area BUFFER is an area for a rotational fluctuation margin of the optical disk. The buffer area changes within a length of 128 to 144 channel bits, i.e., within a length of 16 channel bits with a shift in gap GAP mentioned above.

In the sector format mentioned above, not a conventional simple repeat pattern but a predetermined pattern for synchronizing bytes is inserted in the area of the synchronization code section VF03 preceding the synchronization byte section SYN. The purpose of the synchronization code section VF03 is to synchronize channel bits. From this purpose, a pattern ($T_{min}$) in which a channel bit "1" occurs as many times as possible is desirable. However, bytes of the synchronization code section VF03 have no difference, resulting in a failure in byte synchronization. For this reason, in this sector format, the predetermined pattern for synchronizing bytes is discretely inserted in the synchronization code section VF03.

More specifically, in order to synchronize bytes with respect to a random shift having a 1-byte width of 0 to 16 channel bits, the predetermined pattern is arranged at an interval larger than one byte. Assume that the interval is one byte, and the predetermined pattern is arranged at the first byte, the third byte . . . During reproduction, when the predetermined pattern is detected at the 2.5th byte before the byte synchronization, it is difficult for the optical disk apparatus to determine whether the original position of the detected pattern is the first or third byte. In order to avoid this detection error, the predetermined pattern is arranged at an interval larger than the sum of a length (1-byte length) corresponding to the random shift and a length (about four bits, and one byte or less) corresponding to a synchronization shift which may be caused by another factor, e.g., two bytes.

For example, the predetermined pattern is arranged at bytes 5, 8, 11 and 14. The 2-byte pattern $T_{min}$ subsequent to byte 14 is arranged to assure a 2-byte interval between the synchronization code section VF03 and the synchronization byte section SYN.

The predetermined pattern mentioned above is also used as another pattern prepared for detection of the optical disk apparatus in the sector format. With this arrangement, the number of circuits can be decreased. The predetermined pattern is used in the data area to correct a synchronization shift within q8 channel bits, i.e., to perform resynchronization. The same pattern of the resynchronization code RESYNC is used as the predetermined pattern.

The optical disk 1 shown in FIG. 1 is rotated by a motor 3 at a constant speed, for example. The motor 3 is controlled by a motor control circuit 4.

Turning now to FIG. 1, information is recorded in or reproduced from the optical disk 1 by means of an optical head 5. The optical head 5 is secured to a driving coil 7 which constitutes the rotor of a linear motor 6. The driving coil 7 is connected to a linear motor control circuit 8.

A speed detector 9 is connected to the linear motor control circuit 8. A speed signal representing the speed of the optical head 5 is supplied to the linear motor control circuit 8.

A permanent magnet (not shown) is provided for the stator of the linear motor 6. When the driving coil 7 is magnetized by the linear motor control circuit 8, the optical head 5 is moved in the radial direction of the optical disk 1.

In the optical head 5, an objective lens 10 is supported by either a wire (not shown) or a leaf spring (not shown). The objective lens 10 is moved in the tracking direction (i.e., in the direction perpendicular to the optical axis of the lens) by means of a driving coil 11, and moved in the focusing direction (i.e., in the direction of the optical axis of the lens) by means of a driving coil 12.

A semiconductor laser oscillator 19 is driven by a laser control circuit 13 and generates a laser beam. The laser control circuit 13 comprises a modulation circuit 14 and a laser driving circuit 15, and operates in synchronism with recording clock signals supplied from a PLL circuit (not shown).

The PLL circuit produces a recording clock signal by dividing a fundamental frequency signal supplied from an oscillator (not shown) in such a manner as to obtain a frequency corresponding to a recording position of the optical disk 1.

The modulation circuit 14 modulates recording data supplied from an error correction circuit 32 (to be described later) such that the recording data is converted into 2–7 modulation data, i.e., a signal suitable for recording. The laser driving circuit 15 drives the semiconductor laser oscillator 19 (or an argon neon laser oscillator) of the optical head 5 on the basis of the 2–7 modulation data obtained by the modulation circuit 14.

A laser beam generated by the semiconductor laser oscillator 19 (or argon neon laser oscillator) driven by the laser driving circuit 15 of the laser control circuit 13 is incident on the optical disk 1 after traveling through a collimator lens 20, a half prism 21 and the objective lens 10. The beam reflected by the optical disk 1 is guided to an optical detector 24 by way of the objective lens 10, the half prism 21, a condensing lens 22 and a cylindrical lens 23.

The optical detector 24 is a four-division type made up of light detecting cells 24a, 24b, 24c and 24d.

An output signal of the light detecting cell 24a of the optical detector 24 is supplied through an amplifier 25a to one of two input terminals of an adder 26a. An output signal of the light detecting cell 24b is supplied thorough an amplifier 25b to one of two input terminals of an adder 26b. An output signal of the light detecting cell 24c is supplied through an amplifier 25c to the other input terminal of the adder 26a. An output signal of the light detecting cell 24d is supplied thorough an amplifier 25d to the other input terminal of the adder 26b.

Further, the output signal of the light detecting cell 24a is supplied through the amplifier 25a to one of two input terminals of an adder 26c. The output signal of the light detecting cell 24b is supplied through the amplifier 25b to one of two input terminals of an adder 26d. The output signal of the light detecting cell 24c is supplied through the amplifier 25c to the other input terminal of the adder 26c. The output signal of the light detecting cell 24d is supplied through the amplifier 25d to the other input terminal of the adder 26d.

An output signal of the adder 26a is supplied to the inverted input terminal of a differential amplifier OP2, and an output signal of the adder 26b is supplied to the non-inverted terminal of the same differential amplifier OP2. In accordance with the differential amplifier OP2. In accordance with the difference between the output signals of the adders 26a and 26b, the differential amplifier OP2 produces a signal representing the focusing point and supplies the signal to a focusing control circuit 27. An output signal of the focusing control circuit 27 is supplied to the driving coil 11 which moves the objective lens 10 in the focusing direction. Thus, the laser beam is in focus on the optical disk 1 at all time.

An output signal of the adder 26c is supplied to the inverted input terminal of a differential amplifier OP1, and an output signal of the adder 26d is supplied to the non-inverted terminal of the same differential amplifier OP1. In accordance with the difference between the output signals of the adders 26c and 26d, the differential amplifier OP1 produces a track difference signal and supplies this signal to a tracking control circuit 28. In accordance with the track difference signal supplied from the differential amplifier OP1, the tracking control circuit 28 produces a track driving signal.

The track driving signal output from the tracking control circuit 28 is supplied to the driving coil 12 which moves the objective lens 10 in the tracking direction. The track difference signal sued in the tracking control circuit 28 is supplied to the linear motor control circuit 8.

The sum signal of the outputs which the light detecting cells 24a to 24d of the optical detector 24 produce in the state where focusing and tracking are executed in the above manner, that is, the sum signal which an adder 26e produces after adding the output signals of adders 26c and 26d, bears information reflecting the reflection factors of the pits formed in the track 1. The sum signal is supplied to the data reproducing circuit 18, and the data reproducing circuit 18 reproduces recorded data in accordance.

The data reproduced by the data reproducing circuit 18 is supplied to the error correction circuit 32 by way of a bus 29. The error correction circuit 32 corrects an error in accordance with the error correction code ECC included in the reproduced data. The error correction circuit 32 also attaches an error correction code ECC to recording data supplied from an interface circuit 35, and then supplies the recording data to the memory 2.

After the error correction, the reproduced data is supplied to an optical disk control device 36 (i.e., an external device) by way of the bus 29 and the interface circuit 35. From the optical disk control device 36, recording data is supplied to the error correction circuit 32 by way of the interface circuit 35 and the bus 29.

When the objective lens 10 is moved under the control of the tracking control circuit 28, the linear motor control circuit 8 drives the linear motor 6 and moves the optical head 5 such that the objective lens 10 is located in the neighborhood of the center of the optical head 5.

The subject optical disk apparatus comprises a D/A converter 31 used for information exchange between the CPU 30 (which controls the entire optical disk apparatus) and each of the focusing control circuit 27, the tracking control circuit 28, and the linear motor control circuit 8.

The motor control circuit 4, the linear motor control circuit 8, the laser control circuit 13, the PLL circuit 16, the data reproducing circuit 18, the focusing control circuit 27, the tracking control circuit 28, the error correction circuit 32, etc. are connected to the CPU 30 through the bus 29 and are controlled by the CPU 30. The CPU 30 operates in a predetermined manner on the basis of the program stored in the memory 2.

Figure 9:
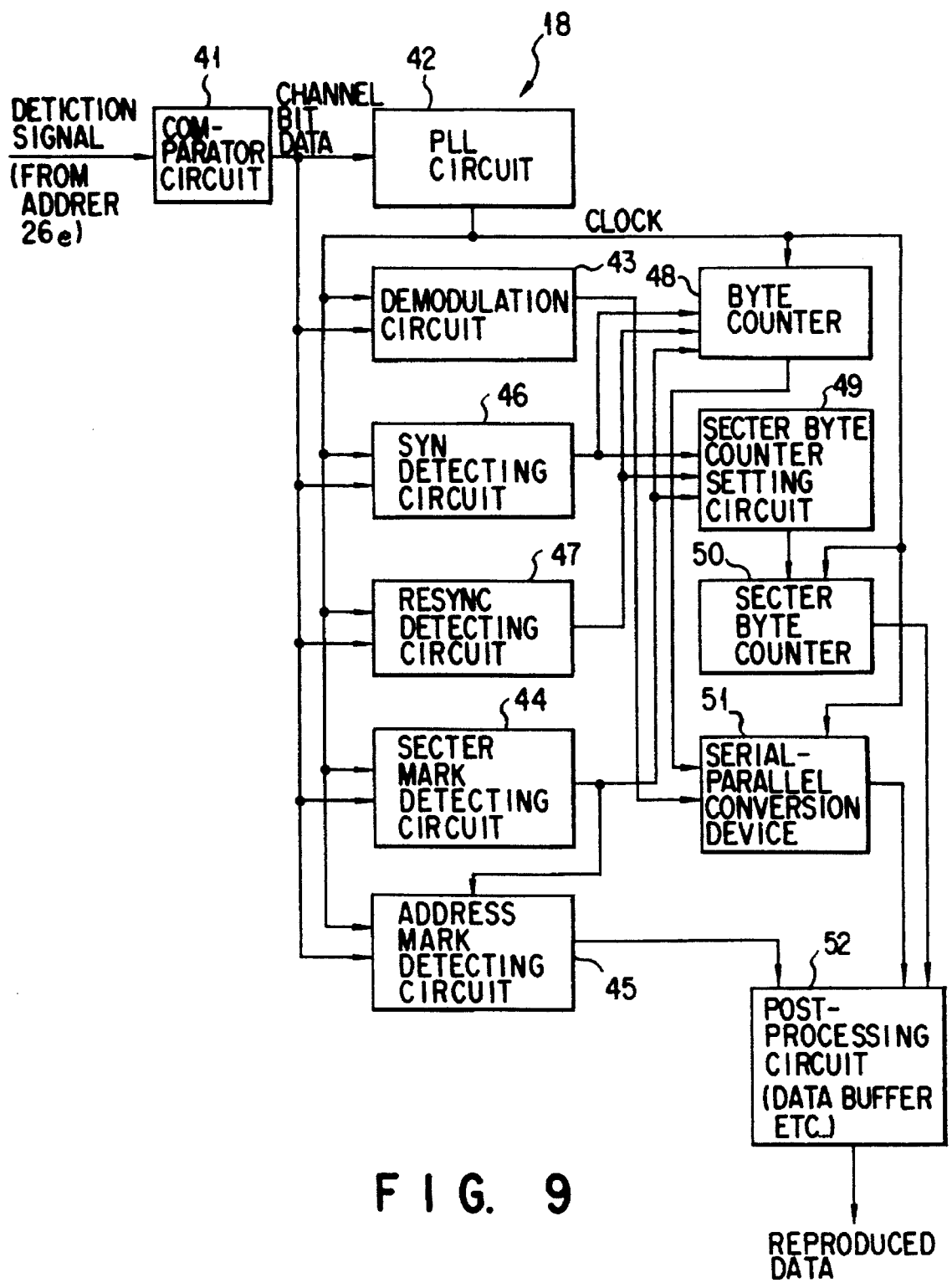
FIG. 9 is a block circuit diagram showing the configuration of the data reproducing circuit depicted in FIG. 1.

The data reproducing circuit 18 shown in FIG. 9 comprises a comparator circuit 41, a PLL circuit 42, a demodulation circuit 43, a sector mark detecting circuit 44, an address mark detecting circuit 45, a data sync (SYN) detecting circuit 46, a resync (RESYNC) detecting circuit 47, a byte counter 48, a sector byte counter setting circuit 49, a sector byte counter 50, a serial-parallel conversion device 51, and a post-processing circuit 52.

The comparator circuit 41 binarizes the sum signal from the adder 26e, and supplies channel bit data. The channel bit data of the comparator circuit 41 is supplied to the PLL circuit 42, the demodulation circuit 43, the sector mark detecting circuit 44, the address mark detecting circuit 45, the data sync (SYN) detecting circuit 46, and the resync (RESYNC)-detecting circuit 47.

The PLL circuit 42 generates a clock signal for reproduction in accordance with a control signal from the CPU 30 and a reproduced synchronization code. The clock signal of the PLL circuit 42 is supplied to the demodulation circuit 43, the sector mark detecting circuit 44, the address mark detecting circuit 45, the data sync detecting circuit 46, the resync detecting circuit 47, the byte counter 48, the sector byte counter 50, and the serial-parallel conversion device 51.

The demodulation circuit 43 is a circuit which modulates, i.e., reproduces the channel bit data of the comparator circuit 41 on the basis of a clock signal from the PLL circuit 42 in accordance with 2–7 code inversion. A modulated signal from the demodulation circuit 43 is supplied to the data byte mark circuit 51.

The sector mark detecting circuit 44 detects the sector mark SM on the basis of the channel bit data from the comparator circuit 41 and the clock signal from the PLL circuit 42, and comprises a register (not shown) and a comparator (not shown). A detection signal of the sector mark is supplied from the sector mark detecting circuit 44 to the address mark detecting circuit 45, the byte counter 48, and the sector byte counter setting circuit 49.

After the detection of the sector mark, the address mark detecting circuit 45 detects the address mark AM in accordance with the channel bit data from the comparator circuit 41 and the clock signal from the PLL circuit 42, and comprises a register (not shown) and a comparator (not shown). A detection signal of the address mark is supplied from the address mark detecting circuit 45 to the post-processing circuit 52.

The data sync detecting circuit 46 detects the data sync SYN in accordance with the channel bit data from the comparator circuit 41 and the clock signal from the PLL circuit 42, and comprises a register (not shown) and a comparator (not shown). A detection signal of the data sync is supplied from the data sync detecting circuit 46 to the byte counter 48 and the sector byte counter setting circuit 49.

The resync detecting circuit 47 detects the reproduction synchronization code RESYNC (resync pattern) in the data area and the resync pattern set in the synchronization code section VF03 in accordance with the channel bit data from the comparator circuit 41 and the clock signal from the PLL circuit 42, and comprises a register (not shown) and a comparator (not shown). A detection signal of the reproduction synchronization signal is supplied from the resync detecting circuit 47 to the byte counter 48 and the sector byte counter setting circuit 49.

The byte counter 48 synchronizes with the detection signal from the sector mark detecting circuit 44, the data sync detecting circuit 46, or the resync detecting circuit 47 to count the clock signal from the PLL circuit 42, and supplies a byte detection signal (corresponding to boundary between bytes) every eight bits, i.e., every byte. The byte detection signal from the byte counter 48 is supplied to the sector byte counter 50 and the serial-parallel conversion device 51.

When the sector byte counter setting circuit 49 receives the detection signal from the sector mark detecting circuit 44, the data sync detecting circuit 46, or the resync detecting circuit 47, the sector byte counter setting circuit 49 synchronizes a sector byte count operation of the sector byte counter 50 with the corresponding number of bytes.

The sector byte counter 50 counts the ordinal byte position in the sector format in accordance with the byte detection signal from the byte counter 48, the clock signal from the PLL circuit 42, and the signal from the sector byte counter setting circuit 49.

The serial-parallel conversion device 51 changes the modulated signal from the demodulation circuit 43 into data in a byte data (8-bit parallel data) in accordance with the detection signal from the byte counter 48 and the clock signal from the PLL circuit 42, and supplies the resultant data to the post-processing circuit 52.

The post-processing circuit 52 stores, in internal data buffers (not shown), a track number, a sector number, and data, all of which are supplied from the serial-parallel conversion device 51 in unit of bytes in accordance with the detection signal from the address mark detecting circuit 45 and the number of sector bytes from the sector byte counter 50. The post-processing circuit 52 comprises data buffers (not shown), and the like.

More specifically, the channel bit data string form the comparator circuit 41 is input to the sector mark detecting circuit 44 and the address mark detecting circuit 45. In the initial section of the sector, when the sector mark SM and the address mark AM are detected, the byte counter 48 and the sector byte counter 50 are set at predetermined values corresponding to detection of the sector mark SM and that of the address mark AM.

A normal set value of the byte counter 48 is "000" (hexadecimal number), and can be reset only by a count element. The sector byte counter 50 has different set values at the time of detection of the sector mark SM and that of the three address marks AM. The set values of the sector byte counter 50 are generated by the sector byte counter setting circuit 49 in correspondence with the detection signal of the sector mark SM and that of the address mark AM. The obtained set value is input to the sector byte counter 50.

In recording with respect to an optical disk of a conventional magnetooptical scheme, the whole sector can be reproduced at a timing detected in this initial section of the sector. In contrast, in recording with respect to an optical disk of the phase change scheme, the random shift section and the subsequent sections cannot be correctly reproduced at a timing detected in the initial section of the sector due to the presence of the random shift section.

When the resync pattern RESYNC in the synchronization code section VF03 is detected by the resync detecting circuit 47 or the data sync SYN is detected by the data sync detecting circuit 46, the byte counter 48 and the sector byte counter 50 are set at the predetermined values corresponding to detection of the resync pattern RESYNC in the synchronization code section VF03 and that of the data sync SYN. The normal set value of the byte counter 48 is "000" (hexadecimal number), and can be reset only by the count element. The sector byte counter 50 has different set values at the time of detection of the resync pattern RESYNC in the synchronization code section VF03 and that of the data sync SYN. The set values of the sector byte counter 50 are generated by the sector byte counter setting circuit 49 in correspondence to the detection signal of the resync pattern RESYNC in the synchronization code section VF03 and that of the data sync SYN. The obtained set value is input to the sector byte counter 50. The sections subsequent to the random shift section in the sector can be reproduced at this detection timing.

The operation of the optical disk apparatus having the arrangement mentioned above will be described below. For example, in data reproduction, a track number and a sector number are supplied from the optical disk control device 36 to the CPU 30 through the interface circuit 35 and the bus 29.

The CPU 30 determines a zone in accordance with the track number, reads out a frequency dividing value in correspondence with the frequency of a clock signal of this zone from the table 2a, and supplies a control signal corresponding to the frequency dividing value to the PLL circuit 42. With this operation, the PLL circuit 42 generates a clock signal to supply it to the sections.

The CPU 30 also controls the linear motor control circuit 8 and the tracking control circuit 28 corresponding to the track number. With this operation, the optical head 5 is moved to a track corresponding to the track number mentioned above, and a laser beam from the optical head 5 corresponds to this track (access processing).

In this state, a read signal with respect to pre-formatted data as the header 11 on the track is binarized by the comparator circuit 41, and the binary signal is supplied to the sector mark detecting circuit 44.

When the sector mark detecting circuit 44 detects the sector mark SM, the detection signal is supplied to the address mark detecting circuit 45 and the byte counter 48.

Then, when the address mark detecting circuit 45 detects the address mark, the detection signal is supplied to the post-processing circuit 52. The post-processing circuit 52 supplies a track number and a sector number as address information of the data byte mark circuit 51 to the CPU 30 in units of bytes.

The CPU 30 discriminates whether these track and sector numbers coincide with the reproduction position. If no, the access processing mentioned above is executed again.

If yes, the CPU 30 corrects an error with respect to reproduction data of the post-processing circuit 52 in units of bytes by means of the error correction circuit 32. Thereafter, the corrected data is supplied to the optical disk control device 36 through the bus 29 and the interface circuit 35.

More specifically, after the detection of the sector mark, when the data sync detecting circuit 46 detects data sync, the detection signal is supplied to the byte counter 48 and the sector byte counter setting circuit 49. With this operation, the byte counter 48 supplies a byte detection signal in synchronism with the received detection signal. The sector byte counter setting circuit 49 executes the sector byte count operation of the sector byte counter 50 also in synchronism with the received detection signal. In this manner, the reproduction data are synchronized.

When not only the data sync SYN, but also a resync pattern in the synchronization code section VF03 is detected by the resync detecting circuit 47 in the period of the synchronization code section VF03, the detection signal is supplied to the byte counter 48 and the sector byte counter setting circuit 49. With this operation, the byte counter 48 supplies a byte detection signal in synchronism with the received detection signal. The sector byte counter setting circuit 49 executes the sector byte count operation of the sector byte counter 50 also in synchronism with the received detection signal. In this manner, the reproduction data are synchronized.

As has been described above, the synchronization code section VF03 preceding the synchronization byte section SYN which serves as data sync before the data area in the recording area of a sector includes not a conventional simple densest pattern but the pattern capable of synchronizing bytes.

With this arrangement, when data is recorded in an optical disk of the phase change scheme by using a random shift, data in the recording area can be reproduced correctly.

The present invention employs the 2–7 code modulation system, but a 1–7 code modulation system may be employed.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A data recording medium having data recorded in tracks comprising:

a plurality of sectors defined by dividing one of the tracks into predetermined lengths;

one of the sectors including a header section that has an address area for recording address information, and a data recording section;

the data recording section including a gap area, a frequency synchronization area, a byte synchronization area, and a data area;

the frequency synchronization area including at least two first areas in which a frequency synchronization pattern is recorded, and a second area, which is positioned between the at least two first areas, in which a specific pattern that is useful for byte synchronization is recorded;

the gap area having a length that is variable so as to allow the frequency synchronization area, the byte synchronization area, and the data area to vary in position within the data recording section.

2. An optical disk comprising:

one of spiral and concentric tracks in which data is recorded, wherein the tracks are a predetermined length and include a plurality of sector areas, wherein one of the sector areas includes a pre-formatted header section and a data recording section;

the header section having:

a plurality of first synchronization code sections in which frequency synchronization patterns are recorded, a plurality of address mark sections, which are positioned subsequent to the first synchronization code section, in which an address mark indicating a start of an address section is recorded, a plurality of address sections, which are positioned subsequent to the address mark sections, in which address information is recorded, and a first postamble section, which is positioned subsequent to a last one of the address sections and indicates an end of the address sections, the data recording section having:

a gap section, which is an empty area and is positioned subsequent to the first postamble section, a second synchronization code section, which is positioned subsequent to the gap section, the second synchronization code section including at least two first areas in which a frequency synchronization pattern is recorded, and a second area, which is positioned between the at least two first areas, in which a first specific pattern that is useful for byte synchronization is recorded, a byte synchronization section, which is positioned subsequent to the second synchronization code section, in which a second specific pattern for byte synchronization is recorded, a data area, which is positioned subsequent to the byte synchronization section, in which the data is recorded, a second postamble section, which is positioned subsequent to the data area and indicates an end of the data area, and a buffer section, which is an empty area and is positioned subsequent to the second postamble section, that serves as a boundary with respect to a subsequent sector area, and wherein the gap section has a length that is variable so as to allow the second synchronization code section, the byte synchronization section, and the data area to vary in position within the data recording section.

3. An optical disk apparatus for reproducing data recorded on an optical disk, wherein the optical disk includes one of spiral and concentric tracks in which the data is recorded, wherein the tracks are a predetermined length and include a plurality of sector areas, wherein one of the sector areas includes a pre-formatted header section and a data recording section, wherein the header section includes:

a plurality of first synchronization code sections in which frequency synchronization patterns are recorded;

a plurality of address mark sections, which are positioned subsequent to the first synchronization code section, in which an address mark indicating start of an address section is recorded, a plurality of address sections which are provided subsequent to the address mark sections and in which address information is recorded, and a first postamble section, which is positioned subsequent to a last one of the address sections, and indicates end of the address sections, wherein the data recording section includes:

a gap section, which is an empty area and is positioned subsequent to the first postamble section, a second synchronization code section, which is positioned subsequent to the gap section, the second synchronization code section including at least two first areas in which a frequency synchronization pattern is recorded, and a second area, which is located between the at least two first areas, in which a first specific pattern that is useful for byte synchronization is recorded, a byte synchronization section, which is positioned subsequent to the second synchronization code section, in which a second specific pattern for byte synchronization is recorded, a data area, which is positioned subsequent to the byte synchronization section, in which the data is recorded, a second postamble section, which is positioned subsequent to the data area and indicates an end of the data area, and a buffer section, which is an empty area and is positioned subsequent to the second postamble section, that serves as a boundary with respect to a subsequent sector area, and wherein the gap section has a length that is variable so as to allow the second synchronization code section, the byte synchronization section, and the data area to vary in position within the data recording section, the optical disk apparatus comprising:

reproducing means for synchronously reproducing the data recorded in the data area in accordance with the frequency synchronization pattern that is recorded in the second synchronization code section, the first specific pattern, and the second specific pattern.

4. An optical disk comprising:

one of spiral and concentric tracks in which data is recorded, wherein the tracks are a predetermined length and include a plurality of sector areas, wherein one of the sector areas includes a pre-formatted header section and a data recording section;

the header section having:

a plurality of first synchronization code sections in which frequency synchronization patterns are recorded, a plurality of address mark sections, which are positioned subsequent to the first synchronization code section, in which an address mark indicating a start of an address section is recorded, a plurality of address sections, which are positioned subsequent to the address mark sections, in which address information is recorded, and a first postamble section, which is positioned subsequent to a last one of the address sections and indicates an end of the address sections, the data recording section having:

a gap section, which is an empty area and is positioned subsequent to the first postamble section, a second synchronization code section, which is positioned subsequent to the gap section, the second synchronization code section including at least two first areas in which a frequency synchronization pattern is recorded, and a second area, which is positioned between the at least two first areas, in which a first specific pattern that is useful for byte synchronization is recorded, a byte synchronization section, which is positioned subsequent to the second synchronization code section, in which a second specific pattern for byte synchronization is recorded, a data area, which is positioned subsequent to the byte synchronization section, in which the data is recorded, a second postamble section, which is positioned subsequent to the data area and indicates an end of the data area, and a buffer section, which is an empty area and is positioned subsequent to the second postamble section, that serves as a boundary with respect to a subsequent sector area, and wherein the gap section and the buffer section have a length that is variable so as to allow the second synchronization code section, the byte synchronization section, and the data area to vary in position within the data recording section.

5. An optical disk apparatus for reproducing data recorded on an optical disk, wherein the optical disk includes one of spiral and concentric tracks in which the data is recorded, wherein the tracks are a predetermined length and include a plurality of sector areas, wherein one of the sector areas includes a pre-formatted header section and a data recording section, wherein the header section includes:

a plurality of first synchronization code sections in which frequency synchronization patterns are recorded;

a plurality of address mark sections, which are positioned subsequent to the first synchronization code section, in which an address mark indicating start of an address section is recorded, a plurality of address sections which are provided subsequent to the address mark sections and in which address information is recorded, and a first postamble section, which is positioned subsequent to a last one of the address sections, and indicates end of the address sections, wherein the data recording section includes:

a gap section, which is an empty area and is positioned subsequent to the first postamble section, a second synchronization code section, which is positioned subsequent to the gap section, the second synchronization code section including at least two first areas in which a frequency synchronization pattern is recorded, and a second area, which is located between the at least two first areas, in which a first specific pattern that is useful for byte synchronization is recorded, a byte synchronization section, which is positioned subsequent to the second synchronization code section, in which a second specific pattern for byte synchronization is recorded, a data area, which is positioned subsequent to the byte synchronization section, in which the data is recorded, a second postamble section, which is positioned subsequent to the data and indicates an end of the data area, and a buffer section, which is an empty area and is positioned subsequent to the second postamble section, that serves as a boundary with respect to a subsequent sector area, and wherein the gap section and the buffer section have a length that is variable so as to allow the second synchronization code section, the byte synchronization section, and the data area to vary in position within the data recording section, the optical disk apparatus comprising:

reproducing means for synchronously reproducing the data recorded in the data area in accordance with the frequency synchronization pattern that is recorded in the second synchronization code section, the first specific pattern, and the second specific pattern.

6. An optical disk comprising:

one of spiral and concentric tracks in which data is recorded using a phase change scheme, wherein the tracks are a predetermined length and include a plurality of sector areas, wherein one of the sector areas includes a pre-formatted header section and a data recording section;

the header section having:
- a plurality of first synchronization code sections in which frequency synchronization patterns are recorded,
- a plurality of address mark sections, which are positioned subsequent to the first synchronization code section, in which an address mark indicating a start of an address section is recorded,
- a plurality of address sections, which are positioned subsequent to the address mark sections, in which address information is recorded, and
- a first postamble section, which is positioned subsequent to a last one of the address sections and indicates an end of the address sections, the data recording section having:
- a gap section, which is an empty area and is positioned subsequent to the first postamble section,
- a second synchronization code section, which is positioned subsequent to the gap section, the second synchronization code section including at least two first areas in which a frequency synchronization pattern is recorded, and a second area, which is positioned between the at least two first areas, in which a first specific pattern that is useful for byte synchronization is recorded,
- a byte synchronization section, which is positioned subsequent to the second synchronization code section, in which a second specific pattern for byte synchronization is recorded,
- a data area, which is positioned subsequent to the byte synchronization section, in which the data is recorded,
- a second postamble section, which is positioned subsequent to the data area and indicates an end of the data area, and
- a buffer section, which is an empty area and is positioned subsequent to the second postamble section, that serves as a boundary with respect to a subsequent sector area, and wherein the gap section has a length that is variable so as to allow the second synchronization code section, the byte synchronization section, and the data area to vary in position within the data recording section.

7. An optical disk apparatus for reproducing data that has been recorded on an optical disk using a phase change scheme, wherein the optical disk includes one of spiral and concentric tracks in which the data is recorded, wherein the tracks are a predetermined length and include a plurality of sector areas, wherein one of the sector areas includes a pre-formatted header section and a data recording section, wherein the header section includes:
- a plurality of first synchronization code sections in which frequency synchronization patterns are recorded;
- a plurality of address mark sections, which are positioned subsequent to the first synchronization code section, in which an address mark indicating start of an address section is recorded,
- a plurality of address sections which are provided subsequent to the address mark sections and in which address information is recorded, and
- a first postamble section, which is positioned subsequent to a last one of the address sections, and indicates end of the address sections, wherein the data recording section includes:
- a gap section, which is an empty area and is positioned subsequent to the first postamble section,
- a second synchronization code section, which is positioned subsequent to the gap section, the second synchronization code section including at least two first areas in which a frequency synchronization pattern is recorded, and a second area, which is located between the at least two first areas, in which a first specific pattern that is useful for byte synchronization is recorded,
- a byte synchronization section, which is positioned subsequent to the second synchronization code section, in which a second specific pattern for byte synchronization is recorded,
- a data area, which is positioned subsequent to the byte synchronization section, in which the data is recorded,
- a second postamble section, which is positioned subsequent to the data area and indicates an end of the data area, and
- a buffer section, which is an empty area and is positioned subsequent to the second postamble section, that serves as a boundary with respect to a subsequent sector area, and wherein the gap section has a length that is variable so as to allow the second synchronization code section, the byte synchronization section, and the data area to vary in position within the data recording section, the optical disk apparatus comprising:
- reproducing means for synchronously reproducing the data recorded in the data area in accordance with the frequency synchronization pattern that is recorded in the second synchronization code section, the first specific pattern, and the second specific pattern.

8. An optical disk comprising:
one of spiral and concentric tracks in which data is recorded using a phase change scheme, wherein the tracks are a predetermined length and include a plurality of sector areas, wherein one of the sector areas includes a pre-formatted header section and a data recording section;

the header section having:
- a plurality of first synchronization code sections in which frequency synchronization patterns are recorded,
- a plurality of address mark sections, which are positioned subsequent to the first synchronization code section, in which an address mark indicating a start of an address section is recorded,
- a plurality of address sections, which are positioned subsequent to the address mark sections, in which address information is recorded, and
- a first postamble section, which is positioned subsequent to a last one of the address sections and indicates an end of the address sections, the data recording section having:
- a gap section, which is an empty area and is positioned subsequent to the first postamble section,
- a second synchronization code section, which is positioned subsequent to the gap section, the second synchronization code section including at least two first areas in which a frequency synchronization pattern is recorded, and a second area, which is positioned between the at least two first areas, in which a first specific pattern that is useful for byte synchronization is recorded, a byte synchronization section, which is positioned subsequent to the second synchronization code section, in which a second specific pattern for byte synchronization is recorded, a data area, which is positioned subsequent to the byte synchronization section, in which the data is recorded, a second postamble section, which is positioned subsequent to the data area and indicates an end of the data area, and a buffer section, which is an empty area and is positioned subsequent to the second postamble section, that serves as a boundary with respect to a subsequent sector area, and wherein the gap section and the buffer section have a length that is variable so as to allow the second synchronization code section, the byte synchronization section, and the data area to vary in position within the data recording section.

9. An optical disk apparatus for reproducing data recorded on an optical disk, wherein the optical disk includes one of spiral and concentric tracks in which the data is recorded using a phase change scheme, wherein the tracks are a predetermined length and include a plurality of sector areas, wherein one of the sector areas includes a pre-formatted header section and a data recording section, wherein the header section includes:

a plurality of first synchronization code sections in which frequency synchronization patterns are recorded;

a plurality of address mark sections, which are positioned subsequent to the first synchronization code section, in which an address mark indicating start of an address section is recorded, a plurality of address sections which are provided subsequent to the address mark sections and in which address information is recorded, and a first postamble section, which is positioned subsequent to a last one of the address sections, and indicates end of the address sections, wherein the data recording section includes:

a gap section, which is an empty area and is positioned subsequent to the first postamble section, a second synchronization code section, which is positioned subsequent to the gap section, the second synchronization code section including at least two first areas in which a frequency synchronization pattern is recorded, and a second area, which is located between the at least two first areas, in which a first specific pattern that is useful for byte synchronization is recorded, a byte synchronization section, which is positioned subsequent to the second synchronization code section, in which a second specific pattern for byte synchronization is recorded, a data area, which is positioned subsequent to the byte synchronization section, in which the data is recorded, a second postamble section, which is positioned subsequent to the data area and indicates an end of the data area, and a buffer section, which is an empty area and is positioned subsequent to the second postamble section, that serves as a boundary with respect to a subsequent sector area, and wherein the gap section and the buffer section have a length that is variable so as to allow the second synchronization code section, the byte synchronization section, and the data area to vary in position within the data recording section, the optical disk apparatus comprising:

reproducing means for synchronously reproducing the data recorded in the data area in accordance with the frequency synchronization pattern that is recorded in the second synchronization code section, the first specific pattern, and the second specific pattern.

10. An optical disk comprising:

a plurality of sector areas, wherein one of the sector areas includes:

a gap section, which is an empty area, a synchronization code section, which is positioned subsequent to the gap section, the synchronization code section including at least two first areas in which a frequency synchronization pattern is recorded, and a second area, which is located between the at least two first areas, in which a first specific pattern that is useful for byte synchronization is recorded, a byte synchronization section, which is positioned subsequent to the synchronization code section, in which a second specific pattern for synchronizing bytes is recorded, a data area, which is positioned subsequent to the byte synchronization section, in which data is recorded, a postamble section, which is positioned subsequent to the data area and indicates an end of the data area, and a buffer section, which is an empty area and is positioned subsequent to the postamble section, that serves as a boundary with respect to a subsequent sector area, and wherein the gap section has a length that is variable so as to allow the synchronization code section, the byte synchronization section, and the data area to vary in position.

11. An optical disk comprising:

a plurality of sector areas, wherein one of the sector areas includes:

a gap section, which is an empty area, a synchronization code section, which is positioned subsequent to the gap section, the synchronization code section including at least two first areas in which a frequency synchronization pattern is recorded, and a second area, which is located between the at least two first areas, in which a first specific pattern that is useful for byte synchronization is recorded, a byte synchronization section, which is positioned subsequent to the synchronization code section, in which a second specific pattern for synchronizing bytes is recorded, a data area, which is positioned subsequent to the byte synchronization section, in which data is recorded, a postamble section, which is positioned subsequent to the data area and indicates an end of the data area, and a buffer section, which is an empty area and is positioned subsequent to the postamble section, that serves as a boundary with respect to a subsequent sector area, and wherein the gap section and the buffer section has a length that is variable so as to allow the synchronization code section, the byte synchronization section, and the data area to vary in position.

12. An optical disk comprising:
a plurality of sector areas, wherein one of the sector areas includes:
   a gap section, which is an empty area,
   a synchronization code section, which is positioned subsequent to the gap section, the synchronization code section including at least two first areas in which a frequency synchronization pattern is recorded, and a second area, which is located between the at least two first areas, in which a first specific pattern that is useful for byte synchronization is recorded,
   a byte synchronization section, which is positioned subsequent to the synchronization code section, in which a second specific pattern for synchronizing bytes is recorded,
   a data area, which is positioned subsequent to the byte synchronization section, in which data is recorded,
   a postamble section, which is positioned subsequent to the data area and indicates an end of the data area, and
   a buffer section, which is an empty area and is positioned subsequent to the postamble section, that serves as a boundary with respect to a subsequent sector area,
   wherein the gap section and the buffer section has a length that is variable so as to allow the synchronization code section, the byte synchronization section, and the data area to vary in position, and
   wherein the first specific pattern and the second specific pattern are recorded at an interval that is greater than a shift amount of the data area.

13. An optical disk apparatus for reproducing data that is recorded on an optical disk using a phase change scheme, wherein the optical disk has a plurality of sector areas, wherein one of the sector areas includes:
   a gap section, which is an empty area,
   a synchronization code section, which is positioned subsequent to the gap section, the synchronization code section including at least two first areas in which a frequency synchronization pattern is recorded, and a second area, which is located between the at least two first areas, in which a first specific pattern that is useful for byte synchronization is recorded,
   a byte synchronization section, which is positioned subsequent to the synchronization code section, in which a second specific pattern for synchronizing bytes is recorded,
   a data area, which is positioned subsequent to the byte synchronization section, in which the data is recorded,
   a postamble section, which is positioned subsequent to the data area and indicates an end of the data area, and
   a buffer section, which is an empty area and is positioned subsequent to the postamble section, that serves as a boundary with respect to a subsequent sector area, and
   wherein the gap section has a length that is variable so as to allow the synchronization code section, the byte synchronization section, and the data area to vary in position, the optical disk apparatus comprising:
      reproducing means for synchronously reproducing the data recorded in the data area in accordance with the frequency synchronization pattern that is recorded in the synchronization code section, the first specific pattern, and the second specific pattern.

14. An optical disk apparatus for reproducing data that is recorded on an optical disk using a phase change scheme, wherein the optical disk has a plurality of sector areas, wherein one of the sector areas includes:
   a gap section, which is an empty area,
   a synchronization code section, which is positioned subsequent to the gap section, the synchronization code section including at least two first areas in which a frequency synchronization pattern is recorded, and a second area, which is located between the at least two first areas, in which a first specific pattern that is useful for byte synchronization is recorded,
   a byte synchronization section, which is positioned subsequent to the synchronization code section, in which a second specific pattern for synchronizing bytes is recorded,
   a data area, which is positioned subsequent to the byte synchronization section, in which the data is recorded,
   a postamble section, which is positioned subsequent to the data area and indicates an end of the data area, and
   a buffer section, which is an empty area and is positioned subsequent to the postamble section, that serves as a boundary with respect to a subsequent sector area, and
   wherein the gap section and the buffer section has a length that is variable so as to allow the synchronization code section, the byte synchronization section, and the data area to vary in position, the optical disk apparatus comprising:
      reproducing means for synchronously reproducing the data recorded in the data area in accordance with the frequency synchronization pattern that is recorded in the synchronization code section, the first specific pattern, and the second specific pattern.

15. An optical disk apparatus for reproducing data that is recorded on an optical disk using a phase change scheme, wherein the optical disk has a plurality of sector areas, wherein one of the sector areas includes:
   a gap section, which is an empty area,
   a synchronization code section, which is positioned subsequent to the gap section, the synchronization code section including at least two first areas in which a frequency synchronization pattern is recorded, and a second area, which is located between the at least two first areas, in which a first specific pattern that is useful for byte synchronization is recorded,
   a byte synchronization section, which is positioned subsequent to the synchronization code section, in which a second specific pattern for synchronizing bytes is recorded,
   a data area, which is positioned subsequent to the byte synchronization section, in which the data is recorded,
   a postamble section, which is positioned subsequent to the data area and indicates an end of the data area, and
   a buffer section, which is an empty area and is positioned subsequent to the postamble section, that serves as a boundary with respect to a subsequent sector area, and
   wherein the gap section and the buffer section has a length that is variable so as to allow the synchronization code section, the byte synchronization section, and the data area to vary in position, and wherein the first specific pattern and the second specific pattern are recorded at an interval that is greater than a shift amount of the data area, the optical disk apparatus comprising:
      reproducing means for synchronously reproducing the data recorded in the data area in accordance with the frequency synchronization pattern that is recorded in the synchronization code section, the first specific pattern, and the second specific pattern.

16. A method for reproducing data that has been recorded on an optical disk using a phase change scheme, the optical disk having a plurality of sector areas, wherein one of the sector areas includes:

a gap section, which is an empty area, a synchronization code section, which is positioned subsequent to the gap section, the synchronization code section including at least two first areas in which a frequency synchronization pattern is recorded, and a second area, which is located between the at least two first areas, in which a first specific pattern that is useful for byte synchronization is recorded, a byte synchronization section, which is positioned subsequent to the synchronization code section, in which a second specific pattern for synchronizing bytes is recorded, a data area, which is positioned subsequent to the byte synchronization section, in which the data is recorded, a postamble section, which is positioned subsequent to the data area and indicates an end of the data area, and a buffer section, which is an empty area and is positioned subsequent to the postamble section, that serves as a boundary with respect to a subsequent sector area, and wherein the gap section has a length that is variable so as to allow the synchronization code section, the byte synchronization section, and the data area to vary randomly in position, the method comprising the step of:

synchronously reproducing the data that is recorded in the data area in accordance with the frequency synchronization pattern that is recorded in the synchronization code section, the first specific pattern, and the second specific pattern.

17. A method for reproducing data that has been recorded on an optical disk using a phase change scheme, the optical disk having a plurality of sector areas, wherein one of the sector areas includes:

a gap section, which is an empty area, a synchronization code section, which is positioned subsequent to the gap section, the synchronization code section including at least two first areas in which a frequency synchronization pattern is recorded, and a second area, which is located between the at least two first areas, in which a first specific pattern that is useful for byte synchronization is recorded, a byte synchronization section, which is positioned subsequent to the synchronization code section, in which a second specific pattern for synchronizing bytes is recorded, a data area, which is positioned subsequent to the byte synchronization section, in which the data is recorded, a postamble section, which is positioned subsequent to the data area and indicates an end of the data area, and a buffer section, which is an empty area and is positioned subsequent to the postamble section, that serves as a boundary with respect to a subsequent sector area, and wherein the gap section and the buffer section has a length that is variable so as to allow the synchronization code section, the byte synchronization section, and the data area to vary in position, the method comprising the step of:

synchronously reproducing the data that is recorded in the data area in accordance with the frequency synchronization pattern that is recorded in the synchronization code section, the first specific pattern, and the second specific pattern.

18. A method for reproducing data that has been recorded on an optical disk using a phase change scheme, the optical disk having a plurality of sector areas, wherein one of the sector areas includes:

a gap section, which is an empty area, a synchronization code section, which is positioned subsequent to the gap section, the synchronization code section including at least two first areas in which a frequency synchronization pattern is recorded, and a second area, which is located between the at least two first areas, in which a first specific pattern that is useful for byte synchronization is recorded, a byte synchronization section, which is positioned subsequent to the synchronization code section, in which a second specific pattern for synchronizing bytes is recorded, a data area, which is positioned subsequent to the byte synchronization section, in which the data is recorded, a postamble section, which is positioned subsequent to the data area and indicates an end of the data area, and a buffer section, which is an empty area and is positioned subsequent to the postamble section, that serves as a boundary with respect to a subsequent sector area, and wherein the gap section and the buffer section has a length that is variable so as to allow the synchronization code section, the byte synchronization section, and the data area to vary in position, and wherein the first specific pattern and the second specific pattern are recorded at an interval that is greater than a shift amount of the data area, the method comprising the step of:

synchronously reproducing the data that is recorded in the data area in accordance with the frequency synchronization pattern that is recorded in the synchronization code section, the first specific pattern, and the second specific pattern.

* * * * *